United States Patent [19]
Kim et al.

[11] Patent Number: 5,905,843
[45] Date of Patent: May 18, 1999

[54] REMOTE-CONTROLLED SYSTEM AND METHOD FOR SELECTIVELY RECORDING DESIRED INFORMATION

[75] Inventors: Byeong-Whan Kim; Heang-Young Kim, both of Seoul, Rep. of Korea

[73] Assignee: Daewoo Electronics Co., Ltd., Seoul, Rep. of Korea

[21] Appl. No.: 08/882,535

[22] Filed: Jun. 25, 1997

Related U.S. Application Data

[63] Continuation-in-part of application No. 08/584,640, Jan. 11, 1996.

[30] Foreign Application Priority Data

Jun. 26, 1995 [KR] Rep. of Korea ...................... 95-18091

[51] Int. Cl.⁶ ................................................. H04N 5/91
[52] U.S. Cl. ........................... 386/83; 379/102.3; 386/95
[58] Field of Search ................................ 386/83, 95–96, 386/75; 348/734; 379/102.03, 102.1, 102.2; H04N 5/91

[56] References Cited

U.S. PATENT DOCUMENTS

| | | | |
|---|---|---|---|
| 4,625,080 | 11/1986 | Scott | 379/104 |
| 4,829,555 | 5/1989 | Hashimoto | 379/70 |
| 4,841,562 | 6/1989 | Lem | 379/104 |
| 5,179,439 | 1/1993 | Hashimoto | 358/86 |
| 5,189,691 | 2/1993 | Dunlop | 379/70 |
| 5,420,913 | 5/1995 | Hashimoto | 379/102 |
| 5,499,102 | 3/1996 | Hashimoto | 358/335 |

Primary Examiner—Wendy Garber
Assistant Examiner—Vincent F. Boccio
Attorney, Agent, or Firm—Pennie & Edmonds LLP

[57] ABSTRACT

A method enables for a remotely located telephone user to selectively preprogram the recording of a desired television (TV) program on a video cassette recorder (VCR) tape or of vocal messages from the caller on a storage device in a receiver telephone set. At a first step, each of input ringing signals is processed to provide a detected ringing signal corresponding thereto. At a next step, the number of the detected ringing signals is counted until the number of the counted ringing signals reaches a first predetermined number. Thereafter, at a checking step, it is checked whether or not there is a first tone signal from the caller's telephone when either the number of the counted ringing signals is equal to the first predetermined number or it is smaller than the first predetermined number but equal to or larger than a second predetermined number. At a final step, if it is checked that the first tone signal is provided from the caller's telephone, accepting preprogramming information provided by the caller to thereby preprogram the desired TV program based on the preprogram information, and if otherwise, recording the caller's voice message in the storage device of the receiver telephone set.

19 Claims, 4 Drawing Sheets

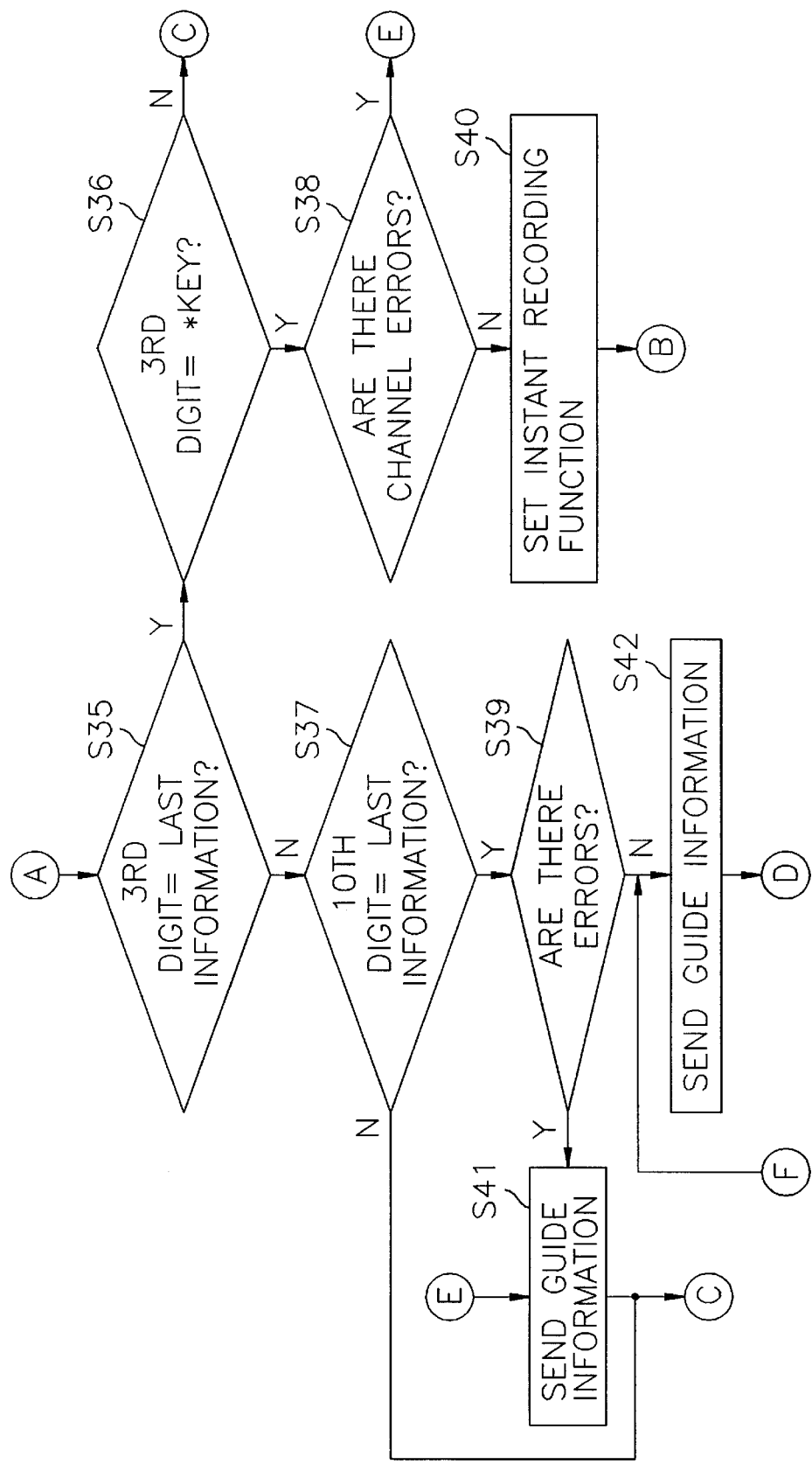

REMOTE-CONTROLLED SYSTEM AND METHOD FOR SELECTIVELY RECORDING DESIRED INFORMATION

CROSS REFERENCE TO RELATED APPLICATION

This application is a continuation-in-part of U.S. Ser. No. 08/584,640 field on Jan. 11, 1996.

FIELD OF THE INVENTION

The present invention relates to a remote-controlled method and system; and, more particularly, to an improved remote-controlled method and system for a telephone user to selectively preprogram the recording of either a desired television (TV) program or of the user's voice messages from a remote distance.

BACKGROUND OF THE INVENTION

A conventional remote-controlled system for a remotely located telephone user to preprogram the recording of a desired TV program utilizes a video cassette recorder (VCR) and a telephone set coupled with the VCR.

However, there is no known prior art remote-controlled system provided with the capability of remotely preprogramming the recording of a desired TV program and at the same time accommodating an automatic telephone answering device coupled to the system.

SUMMARY OF THE INVENTION

It is, therefore, a primary object of the present invention to provide a remote-controlled method and system for enabling a remotely located telephone caller to selectively preprogram the recording of either a desired TV program or the caller's voice messages.

In accordance with the present invention, there is provided a method for enabling a remotely located telephone caller to selectively preprogram the recording of a desired television (TV) program on a video tape loaded in a video cassette recorder (VCR) or of a voice message provided from the caller in a storage device of a receiver telephone set associated with the VCR, the method comprising the steps of:

(a) detecting each of ringing signals to provide a detected ringing signal corresponding thereto, wherein each of the ringing signals is sequentially provided by pressing numeric keys on the caller's telephone which correspond to the receiver telephone number;

(b) counting the number of the detected ringing signals until the number of the counted ringing signals reaches a first predetermined number;

(c) checking whether or not there is a first tone signal from the caller's telephone when either the number of the counted ringing signals is equal to the first predetermined number or it is smaller than the first predetermined number but equal to or larger than a second predetermined number; and (d) if it is checked that the first tone signal is provided from the caller's telephone, accepting preprogramming information provided by the caller to thereby preprogram the desired TV program based on the preprogram information, and if otherwise, recording the caller's voice message in the storage device of the receiver telephone set, wherein the preprogramming information contains data on a channel number of the desired TV program, a recording start time and a recording end time.

BRIEF DESCRIPTION OF THE DRAWINGS

The above and other objects and features of the present invention will become apparent from the following description of preferred embodiments given in conjunction with the accompanying drawings, in which:

FIGS. 2A to 2C present flow charts illustrating the method for selectively recording desired information in accordance with the invention.

DETAILED DESCRIPTION OF THE PREFERRED EMBODIMENTS

Figure 1:
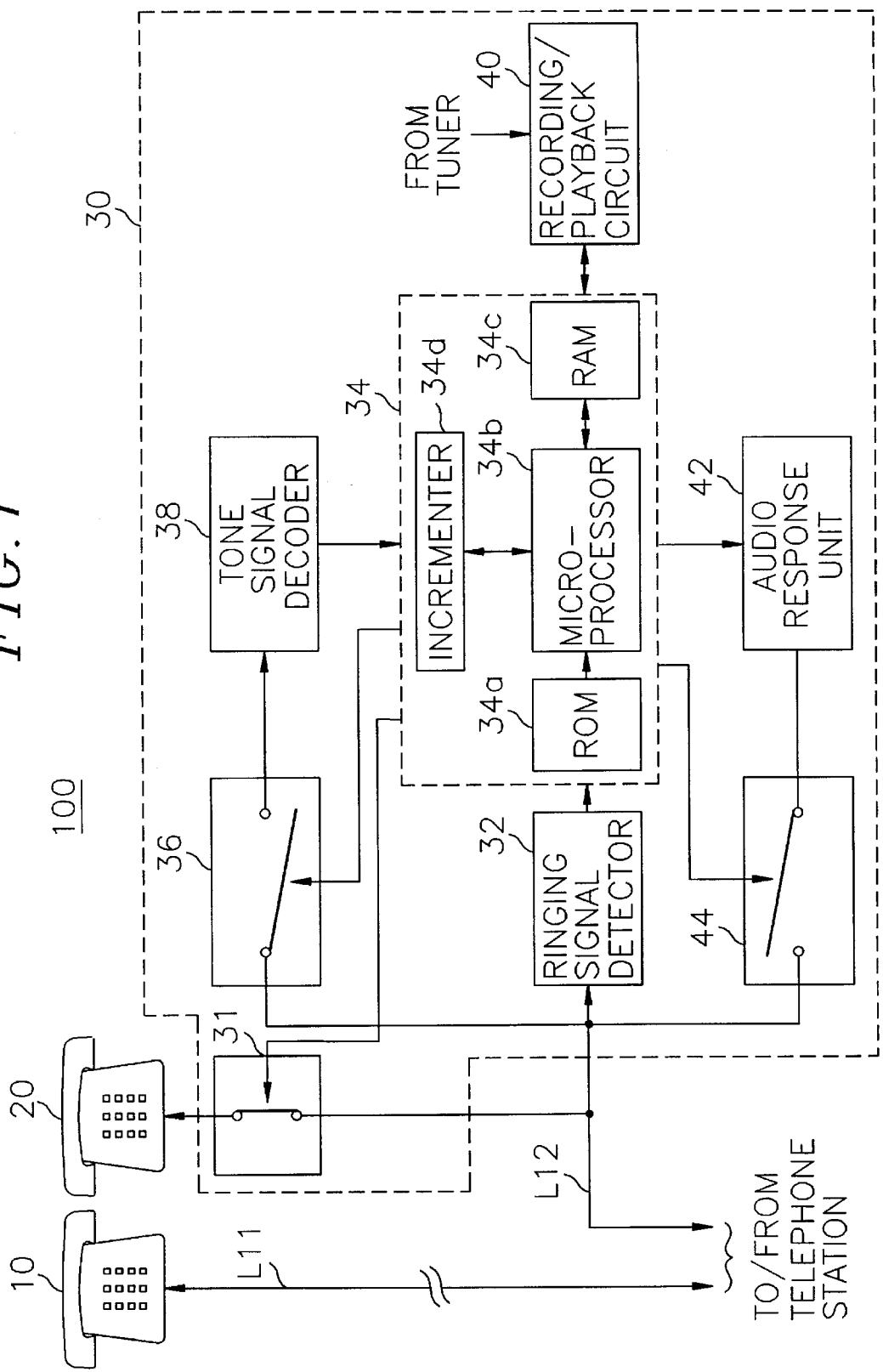
FIG. 1 is a block diagram of a novel remote-controlled system for selectively recording desired information in accordance with the present invention.

Referring to FIG. 1, there is shown a block diagram of a remote-controlled system 100 of the present invention for a remotely located telephone caller to selectively preprogram the recording of either a desired TV program from a tuner (not shown) or his voice messages. The inventive remote-controlled system 100 comprises a remotely located caller's telephone set 10, a VCR apparatus 30, and a receiving telephone set 20, e.g., an automatic telephone answering device, which is coupled with the VCR apparatus 30.

An ordinary telephone includes a number of keys (not shown) which can be used as selection keys to issue tone signals, a first selection tone signal for selecting either a preprogrammed recording mode or an automatic answering mode and a second selection tone signal to choose a preprogrammed recording function or an instant recording function. A pound marked key, i.e., #, and a star marked key, i.e., *, on the caller's telephone set 10, may be utilized as a first and a second selection tone signal keys, respectively.

When the caller calls from his phone 10 to the receiver set 20 via telephone lines L11 and L12, each of ringing signals is sequentially sent to the telephone set 20 through a first switch 31 included in the VCR apparatus 30 and to a ringing signal detector 32 thereof, wherein said each ringing signal is comprised of a sequence of cycles of sine waves.

The VCR apparatus 30 includes the first, a second and a third switches 31, 36 and 44, the ringing signal detector 32, a system controller 34, a tone signal decoder 38, a recording/playback circuit 40 and an audio response unit 42.

The ringing signal detector 32 converts each of the ringing signals into a converted ringing signal having a sequence of cycles of logic high and low states and provides the converted ringing signal to the system controller 34.

The system controller 34, which may be implemented with a microcomputer, includes a read only memory (ROM) 34a for storing various programs, a microprocessor 34b, a random access memory (RAM) 34c for storing a set of preprogramming information that may be changed or updated, a timer (not shown) for providing time data, and an incrementer 34d for incrementing the number of converted ringing signals applied thereto. Based on the converted ringing signals provided from the ringing signal detector 32, the system controller 34 issues a first switch control signal (SCS1) to the first switch 31 to selectively couple the second telephone line L12 to the receiving telephone 20 and a second switch control signal (SCS2) to the second switch 36 to selectively connect the second telephone line L12 to the tone signal decoder 38.

At the tone signal decoder 38, each of tone signals provided through the telephone line L12 is converted into a decoded tone signal of, e.g., 4-bit binary data, thereby applying the decoded tone signal to the system controller 34, wherein each tone signal is issued by pressing a corresponding tone signal key at the calling telephone 10.

In response to the decoded tone signal, the system controller 34 provides a corresponding guide information control signal, which is one of five guide information control signals (GCS1 to GCS5), to the audio response unit 42 and a mechanism control signal (MCS) to a recording/playback circuit 40; and in response to the decoded tone signal and the converted ringing signals from the ringing signal detector 32, it issues one of three switch control signals (SCS1 to SCS3) to a corresponding one of the switches 31, 36 and 44. The audio response unit 42, responsive to each of the GCS1 to GCS5 from the controller 34, serves to send its corresponding guide information prestored in a memory 42a thereof to the user at the calling telephone 10 through the third switch 44, which is controlled by the SCS3 issued from the system controller 34.

For example, if the decoded tone signal corresponds to either a preprogrammed recording or an instant recording, the system controller 34 provides the recording/playback circuit 40 with the MCS for performing either one of the two functions.

Details of the operation to selectively record a desired TV program or user's voice messages in accordance with the invention will now be described with reference to FIGS. 1, and 2A to 2C.

Figure 2A:
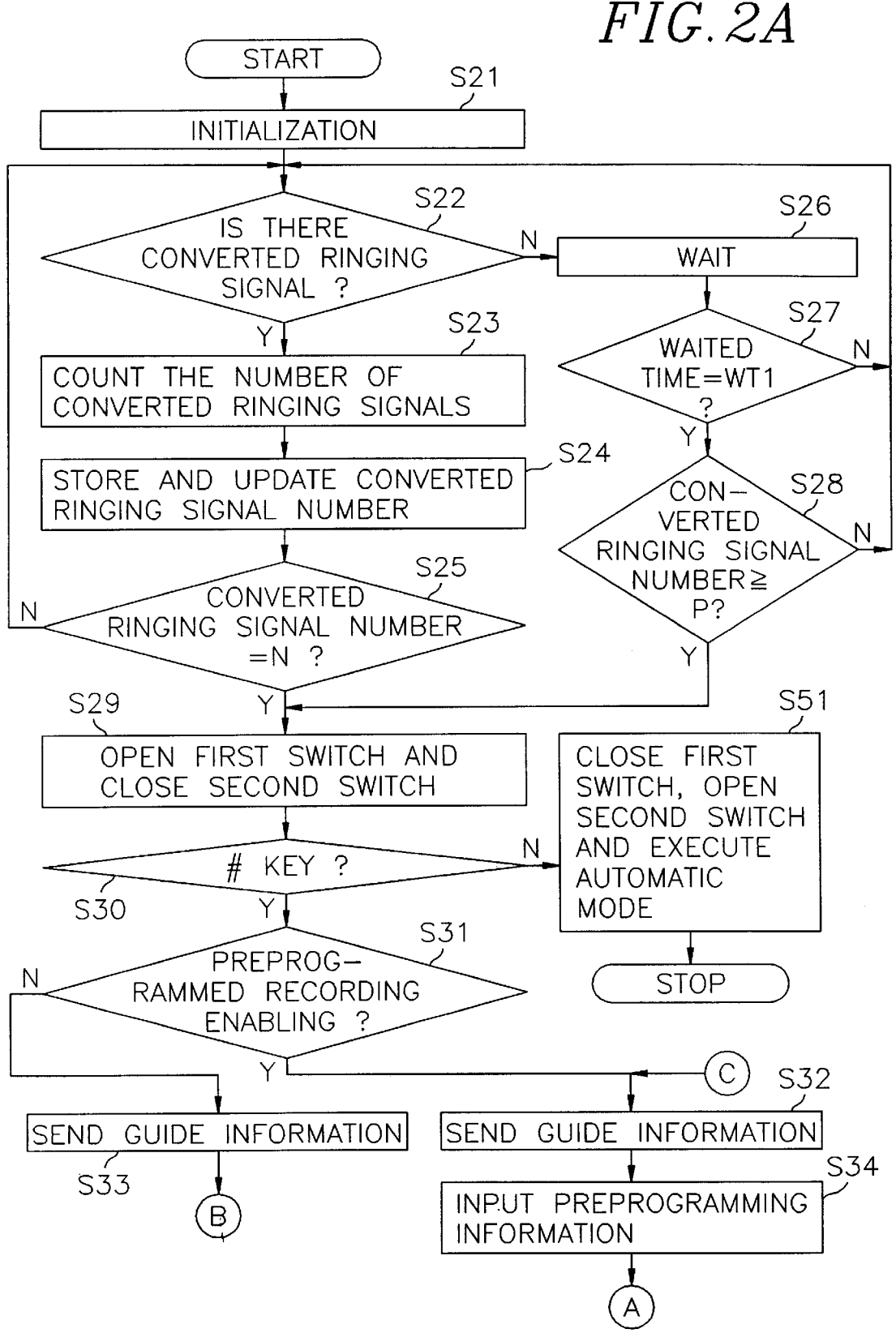
Figure 2C:
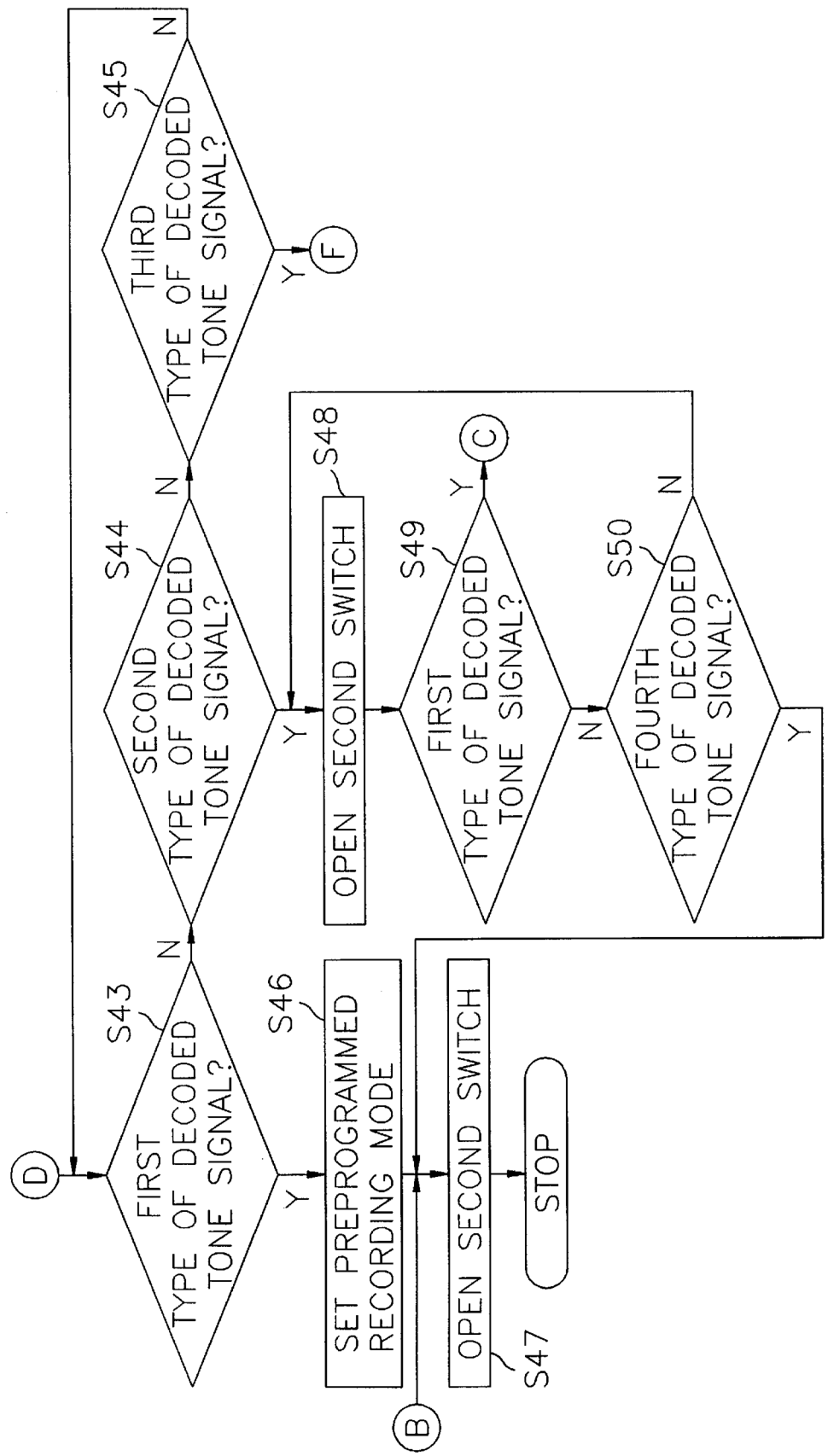

As shown in FIG. 2A, at step S21, the inventive process is initiated by pressing numeric keys on the calling telephone 10 corresponding to a phone number of the receiving telephone 20 so as to provide sequentially each of ringing signals via the ringing signal detector 32 to the system controller 34. As mentioned above, each of the ringing signals having a sequence of cycles of sine waves is converted into a converted ringing signal with a sequence of cycles of logic high and low states at the ringing signal detector 32 to provide the converted ringing signal to the system controller 34.

At step S22, the system controller 34 checks whether or not there is the converted ringing signal from the ringing signal detector 32, wherein use is made of a conventional ringing signal checking method well known in the art. If the checked result is YES, the process goes to step S23, and, if otherwise, the process goes to step S26.

At step S23, the number of converted ringing signal is incremented at the incrementer 34d by one, and thereafter, at step S24, the incremented number of converted ringing signal derived at the incrementer 34d is stored and updated in the RAM 34c.

Subsequently, the system controller 34 compares newly updated number in the RAM 34c with a first predetermined number N, e.g., 8, at step S25, and when the newly updated number is smaller than N, the process returns to step S22 in order to repeat the processes of steps S22 to S25 until the newly updated number reaches N, N being a positive integer. As is well known in the art, since there is a finite time gap between two converted ringing signals and it usually takes very short time for performing the steps S23 to S25, the process will return to step S22 before a next converted ringing signal arrives if there is any. Through repeating the processes of steps S22 to S25, if the updated number in the RAM 34c becomes equal to N, then the inventive procedure proceeds to step S29.

On the other hand, at step S22, if converted ringing signal is not inputted to the system controller 34, the process goes to step S26 to wait for a predetermined time duration WT1, wherein WT1 may be decided based on the time interval needed for the system controller to perform all the checks to make it sure that there be no converted ringing signal after the previous receipt of the converted ringing signal, and will be longer than the time gap between two converted ringing signals.

At a next step S27, the system controller 34 checks whether the waiting time at step S26 has reached WT1 or not. If the check result is NO, the process returns to step S22 and if otherwise, the process goes to step S28. This looping through steps S22, S26 and S27 will be continued until either a next or any converted ringing signal is detected at step S22 to thereby proceed to step S23 or the time interval elapsed reaches WT1 to thereby proceed to step S28.

At step S28, the controller 34 compares the number of newly updated normal ringing signals stored in the RAM 34c with a second predetermined number P, e.g., 1, P being a positive integer. In accordance with a preferred embodiment of the invention, the number P is decided based on the concept that the answering machine 20 is usually set to respond after the receipt of a smaller number of converted ringing signals than the first predetermined number N, i.e., 8. If the newly updated number is less than P, the process returns to step S22. However, if the newly updated number is equal to or greater than P, the process goes to step S29. Such an instance can occur, for example, when the answering machine 20 answers the calling telephone 10, or the caller hangs up the phone, or a person picks up other phone coupled with the answering machine 20.

As can be seen from the above, in case either the newly updated converted ringing signal number is equal to N at step S25, or it is larger than or equal to P at step S28, the inventive procedure goes to step S29 where the controller 34 controls the operations of the switches 31 and 36. Specifically, at step S29, the controller 34 issues the first switch control signal SCS1 of logic low level to the first switch 31 to decouple the receiver telephone set 20 from the second telephone line L12 after a predetermined time period. The predetermined time period is defined by a time duration taken until recording guide information recorded on the cassette tape provided in the receiver telephone 20 is sent to the caller's telephone 10 via the first switch 31. At the same time the system controller 34 issues the second switch control signal SCS2 of logic high value to the second switch 36 to couple the second telephone line L12 to the tone signal decoder 38.

At step S30, the system controller 34 checks whether or not a decoded tone signal indicating a start of preprogramming for the recording of a desired TV program triggered by processing, e.g., the pound marked key #, is applied from the tone signal decoder 38 thereto within a predetermined time. If the check result is YES, the process flows to step S31, and if otherwise, the process proceeds to step S51 where the controller 34 provides the SCS1 of logic high level to the first switch 31 and the SCS2 of logic low level to the second switch 36.

In response to the SCS1 of logic high level, the first switch 31 is closed so that the receiver telephone set 20 can execute the recording of voice messages of the user transmitted from a remote location on the cassette tape installed within the receiver telephone set 20; and, in response to the SCS2 of logic low level, the second switch 36 is open to decouple the tone signal decoder 38 from the second telephone line L12. Although it is not specifically shown in FIGS. 1, and 2A to 2C for the sake of brevity, it should be apparent to those skilled in the art that the automatic answering mode of recording the user's voice messages can be performed by using a conventional automatic answering processing method well known in the art. For the automatic answering mode, the receiver set 20 is provided with a device that carries out a same function as in the ringing signal detector 32 of the VCR apparatus 30.

At step S31, on the other hand, the system controller 34, which monitors the state of components, e.g., a video tape, included in the recording/playback circuit 40, checks whether the preprogrammed recording mode is enabled or not. If the check result is NO, the process goes to step S33 where the audio response unit 42, in response to the GCS1 issued from the system controller 34, sends guide information which corresponds to an error type checked in step S31 via the third switch 44 to the user at the remote telephone set 10, wherein the third switch 44 is closed based on the SCS3 of logic high level from the system controller 34. And then, the process goes to step S47 in FIG. 2C through tap B. However, if the check result is YES, the process goes to step S32.

At step S32, the audio response unit 42, which is responsive to the GCS2 provided from the system controller 34, generates its corresponding guide information and transmits same to the user at the remote telephone set 10 through the third switch 44. In this case, in a preferred embodiment of the invention, the guide information may read as follows: "please press or input numeric keys which correspond to a desired channel number in two digits, a recording start time in four digits and a recording end time in four digits sequentially" on the caller telephone set 10. The information assigned to each of the digits is a decimal number.

Thereafter, the process goes to step S34 where the system controller 34 receives each of the decoded tone signals sequentially provided from the tone signal decoder 38, wherein each of the decoded tone signals represents the information needed for the preprogramming supplied by the user as described above, and the process proceeds to step S35 shown in FIG. 2B through a tap A.

At step S35, the system controller 34 checks whether or not a third digit in the preprogramming information is the last information applied thereto. If the condition is satisfied, the process goes to step S36, and if otherwise, the process goes to step S37 where the system controller 34 tests whether a tenth digit in the preprogramming information is inputted thereto or not. At step S37, if the test result is NO, the process returns to step S32 shown in FIG. 2A through a tap C, and if otherwise, the process goes to step S39, wherein the system controller 34 checks the state of all of the inputted preprogramming information. In a preferred embodiment of the invention, for example, if there is at least one erroneous data in the inputted preprogramming information, the process goes to step S41, and if otherwise, the process goes to step S42.

At step S41, in response to the GCS3 issued from the system controller 34, the audio response unit 42 reads its corresponding guide information stored therein, i.e., information indicating errors present in the inputted preprogramming information, to thereby send it via the third switch 44 to the user, and the process returns to step S32 shown in FIG. 2A through the tap C.

In the meanwhile, at step S36, the system controller 34 checks if the third digit, when it is the last information inputted thereto, is the information that corresponds to the star marked key *, i.e., the instant recording function. If the check result is NO, the process returns to step S32 shown in FIG. 2A through the tap C, and if otherwise, the process proceeds to step S38 where the system controller 34 checks whether or not errors are found in the first two digits of the inputted preprogramming information, i.e., the channel information.

If errors are found at step S38, the process returns to step S41 through a tap E to send its corresponding guide information to the user, and if otherwise, the process goes to step S40 where the system controller 34 sets the instant recording function by issuing the MCS to the recording/playback circuit 40 so that it can immediately start to record the TV program of the selected channel. And then, the process goes to step S47 shown in FIG. 2C through the tap B for decoupling the second telephone line L12 from the tone signal decoder 38.

On the other hand, at step S42, the audio response unit 42, in response to the GCS4 issued from the system controller 34, sends its corresponding guide information, i.e., information on the inputted channel, recording start time and recording end time back to the caller at the outside calling telephone 10 through the third switch 44. From such information, the user can easily confirm that the preprogramming information inputted is correct information or not. Thereafter, the process goes to step S43 shown in FIG. 2C through a tap D.

At step S43, the system controller 34 checks whether the user wants the preprogrammed recording of the desired TV program. If the check result is NO, i.e., a first type of decoded tone signal for, e.g., numeric key 1, is not applied from the tone signal decoder 38 to the system controller 34, the process proceeds to step S44. However, at step S43, if the check result is YES, i.e., the first type of decoded tone signal therefor is applied to the system controller 34, the process proceeds to step S46 where the system controller 34 activates the preprogrammed recording mode so that the recording/playback circuit 40 can record the TV program received through the preprogrammed channel in response to the MCS provided from the system controller 34 when the time of the timer reaches the preprogrammed recording start time.

On the other hand, at step S44, the system controller 34 checks whether or not the user wishes to cancel the inputted preprogramming information. If the check result is NO, i.e., a second type of decoded tone signal for, e.g., numeric key 2, is not applied from the tone signal decoder 38 to the system controller 34, the process goes to step S45, and if otherwise, i.e., the second type of decoded tone signal therefor is applied to the system controller 34, the process goes to step S48.

At step S48, the audio response unit 42, which is responsive to the GCS5 provided from the system controller 34, then sends corresponding guide information to the user through the third switch 44 so as to cancel all the inputted preprogramming information.

At step S45, the system controller 34 checks whether or not the user wishes to hear all the inputted preprogramming information once again. If positive, i.e., a third type of decoded tone signal for, e.g., numeric key 3, is applied from the tone signal decoder 38 to the system controller 34, the process returns to step S42 shown in FIG. 2B through a tap F, and if otherwise, i.e., the third type of decoded tone signal therefor is not applied to the system controller 34, the process returns to step S43.

After sending the guide information to cancel all the inputted programming information to the user in step S48, at step S49, the system controller 34 again checks whether or not the user wants the preprogrammed recording of the desired TV program. If the check result is YES, i.e., the first type of decoded tone signal for the numeric key 1 is applied once again from the tone signal decoder 38 to the system controller 34, the process returns back to step S32 through the tap C to perform the inputting operation for the preprogramming information, and if otherwise, i.e., if the first type of decoded tone signal therefor is not applied once again to the system controller 34, the process proceeds to step S50.

At step S50, the system controller 34 tests whether the user wishes to terminate the whole process. If not, i.e., a fourth type of decoded tone signal for, e.g., numeric key 4, is applied from the tone signal decoder 38 to the system controller 34, the process returns to step S48, and if otherwise, i.e., if the first type of decoded tone signal therefor is not applied again to the system controller 34, the process goes to step S47 where the controller 34 provides the SCS2 of logic low level to the second switch 36 for decoupling the tone signal decoder 38 from the second telephone line L12 and then the whole process is stopped.

While the present invention has been shown and described with respect to the particular embodiment, it will be apparent to those skilled in the art that many changes and modifications may be made without departing from the spirit and scope of the invention as defined in the appended claims.

What is claimed is:

1. A method for enabling a remotely located telephone caller to selectively preprogram the recording of a desired television (TV) program on a video tape loaded in a video cassette recorder (VCR) or record a voice message provided from the caller in a storage device of a receiver telephone set associated with the VCR, the method comprising the steps of:

(a) detecting each of ringing signals to provide a detected ringing signal corresponding thereto, wherein each of the ringing signals is sequentially provided by pressing numeric keys which correspond to the telephone number of the receiver the numeric keys being provided in the caller's telephone;

(b) counting the number of the detected ringing signals;

(c) picking up a line from the caller when either the counted number of the detected ringing signals is equal to a first predetermined number or it is smaller than the first predetermined number but equal to or larger than a second predetermined number and checking after picking up the line whether there is a first tone signal from the caller's telephone, wherein the step (c) includes the steps of:

(c1) checking whether or not the counted number of the detected ringing signals is equal to the first predetermined number;

(c2) if the counted number of the detected ringing signals is equal to the first predetermined number, picking up the line from the caller, and if otherwise, repeating the processes of the steps (a), (b) and (c1) until the counted number of the detected ringing signal becomes equal to the first predetermined number;

(c3) if a ringing signal is not detected at the step (a) during the repeating processes, waiting for a predetermined time and comparing the counted number of the detected ringing signal with the second predetermined number if an additional ringing signal is not detected until the waited time has been reached the predetermined time; and (c4) if the counted number of the detected ringing signal is equal to or larger than the second predetermined number, picking up the line from the caller; and (d) if it is checked that the first tone signal is provided from the caller's telephone, accepting preprogramming information provided by the caller to thereby preprogram the desired TV program based on the preprogramming information, wherein the preprogramming information contains data on a channel number of the desired TV program, a recording start time and a recording end time;

(e) if it is checked that the first tone signal is not provided from the caller's telephone, recording the caller's voice message in the storage device of the receiver telephone set;

(f) issuing two switch control signals, a first and a second switch control signals, based on the counted number of the detected ringing signals and the first tone signal; and (g) connecting the first switch A from the caller to the receiver telephone to record the caller's voice message in response to the control signal and the line to the VCR to preprogram the recording of the desired TV program in response to the second switch control signal.

2. The method of claim 1, further comprising, after the step (d), the step of:

(d1) if there is a second tone signal from the caller's telephone after the receipt of the first tone signal, immediately starting to record the desired TV program based on the channel data in the preprogramming information.

3. The method of claim 2, wherein the step (d) includes the step of providing guide information to the caller's telephone in response to the first tone signal to prompt the preprogramming information.

4. The method of claim 3, wherein the guide information is generated from an audio response unit included in the VCR.

5. The method of claim 1, wherein the data on the channel, the recording start time and the recording end time is assigned with two digits, four digits, four digits, respectively.

6. The method of claim 1, wherein the receiver telephone set is an automatic telephone answering device; and the second predetermined number is preset for the answering device.

7. The method of claim 6, wherein the second predetermined number is 1.

8. A remote-controlled system for a remotely located telephone caller to selectively preprogram the recording of a desired television (TV) program on a video tape loaded in a video cassette recorder (VCR) or record a voice message provided from the caller in a storage device of a receiver telephone set associated with the VCR, the system comprising:

means for detecting each of ringing signals to provide a detected ringing signal corresponding thereto, wherein each of the ringing signals is sequentially provided by pressing numeric keys which correspond to the telephone number of the receiver, the numeric keys being provided in the caller's telephone;

means for counting the number of the detected ringing signals;

means for picking up a line from the caller when either the counted number of the detected ringing is equal to a first predetermined number or it is smaller than the first predetermined number but equal to or larger than a second predetermined number and checking after picking up the line whether there is a first tone signal from the caller's telephone, wherein the picking means includes:
    means for checking whether or not the counted number of the detected ringing signal is equal to the first predetermined number;
    means for, if the counted number of the detected ringing signal is equal to the first predetermined number, picking up the line from the caller and, if otherwise, repeating the detecting, the counting and the checking operations until the counted number of the detected ringing signal becomes equal to the first predetermined number;
    means for, if a ringing signal is not detected at the detecting means during the repeating operations, waiting for a predetermined time and comparing the counted number of
    the detected ringing signal with the second predetermined number if an additional ringing signal is not detected until the waited time has been reached the predetermined time; and
    means for, if the counted number of the detected ringing signal is equal to or larger than the second predetermined number, picking up the line from the caller; and
    means for accepting, if it is checked that the first tone signal is provided from the caller's telephone, preprogramming information provided by the caller to thereby preprogram the desired TV program based on the preprogramming information, wherein the preprogramming information contains data on a channel number of the desired TV program, a recording start time and a recording end time;
    means for recording,if it is checked that the first tone signal is not provided from the caller's telephone, the caller's voice message in the storage device of the receiver telephone set;
    means for issuing two switch control signals, a first and a second switch control signals, based on the counted number of the detected ringing signals and the first tone signal; and
    switching means for connecting the line from the caller to the receiver telephone to record the caller's voice message in response to the first switch control signal and the line to the VCR to preprogram the recording of the desired TV program in response to the second switch control signal.

9. The system of claim 8, further comprising means for immediately recording, if there is a second tone signal from the caller's telephone after the receipt of the first tone signal, the desired TV program based on the channel data in the preprogramming information.

10. The system of claim 9, wherein the preprogramming and recording means includes means of providing guide information to the caller's telephone in response to the first tone signal to prompt the preprogramming information.

11. The system of claim 10, wherein the guide information is generated from an audio response unit included in the VCR.

12. The system of claim 11, wherein the accepting means includes:
    first checking means for checking whether or not the preprogramming recording is enabled by monitoring a status of a recording/playback circuit contained in the VCR;
    means for sending, if the preprogramming of the recording is enabled, the guide information to the caller's telephone to prompt the preprogramming information;
    means for accepting the preprogramming information provided by the caller after sending the guide information;
    second checking means for checking whether or not a tenth digit in the preprogramming information is last information therein;
    means for testing, if the tenth digit is the last information in the preprogramming information, the status of all the preprogramming information;
    means for sending, if there is no error in the preprogramming information, the guide information on the channel, the recording start time and the recording end time in the preprogramming information to the caller to confirm whether the preprogrammed information is correct; and
    means for preprogramming the recording of the desired TV program based on the preprogramming information, if confirmation information to preprogram the desired TV program is received from the caller after sending the guide information for the confirmation of the preprogramming information.

13. The system of claim 12, wherein the accepting means further includes;
    means for issuing a third switch control signal if the preprogramming of the recording is not enabled;
    means for connecting, in response to the third switch control signal, the automatic response unit in the VCR to the caller's telephone; and
    means for sending the guide information, which corresponds to an error type at the first checking means, stored in the automatic response unit to the caller's telephone.

14. The system of claim 9, wherein the immediate recording means includes:
    means for checking whether or not a third digit in the preprogramming information is last information therein;
    means for deciding, if the third digit is the last information in the preprogramming information, whether or not the third digit is the second tone signal from the caller's telephone;
    means for checking, if the third digit is the second tone signal, whether or not there is and error in the channel information which is the first two digits in the preprogramming information; and
    means for, if there is no error in the channel information, immediately starting to record the caller's voice messages into the storage device of the receiver telephone.

15. The system of claim 8, wherein the data on the channel, the recording start time and the recording end time is assigned with two digits, four digits, four digits, respectively.

16. The system of claim 8, wherein the recording means includes:
    means for issuing the first and the second switch control signals if the first tone signal is not provided from the caller's telephone;
    means for connecting the line from the caller's telephone to the receiver telephone set to transfer the caller's voice message to the receiver telephone set in response to the first switch control signal and decoupling the line from the VCR to prevent the caller's voice message from being applied to the VCR in response to the second switch control signal; and
    means for recording the caller's voice message in the storage device of the receiver telephone set.

17. The system of claim 8, further comprising means for storing and updating the counted number of the detected ringing signals.

18. The system of claim 8, wherein the receiver telephone set is an automatic telephone answering device; and the second predetermined number is preset for the answering device.

19. The system of claim 18, wherein the second predetermined number is 1.

* * * * *